US012700032B2

(12) United States Patent
Friedman

(10) Patent No.: US 12,700,032 B2
(45) Date of Patent: Aug. 4, 2026

(54) DYNAMIC TIMING AND PRICING FOR ONLINE RETAIL PLATFORM

(71) Applicant: Trade Floor, LLC, Irvine, CA (US)

(72) Inventor: Robert D. Friedman, Irvine, CA (US)

(73) Assignee: Trade Floor, LLC, Irvine, CA (US)

( * ) Notice: Subject to any disclaimer, the term of this patent is extended or adjusted under 35 U.S.C. 154(b) by 410 days.

(21) Appl. No.: 18/114,727

(22) Filed: Feb. 27, 2023

(65) Prior Publication Data

US 2024/0289874 A1 Aug. 29, 2024

(51) Int. Cl.
*G06Q 30/08* (2012.01)

(52) U.S. Cl.
CPC .................................... *G06Q 30/08* (2013.01)

(58) Field of Classification Search
None
See application file for complete search history.

(56) References Cited

U.S. PATENT DOCUMENTS

| | | | | |
|---|---|---|---|---|
| 7,580,870 | B1 | 8/2009 | Chang | |
| 8,036,949 | B2 | 10/2011 | Nassiri | |
| 8,271,345 | B1 | 9/2012 | Milgrom et al. | |
| 8,442,883 | B2 | 5/2013 | Rashid | |
| 8,725,622 | B2 | 5/2014 | Gujral et al. | |
| 9,811,855 | B1 | 11/2017 | Lark et al. | |
| 10,157,417 | B2 | 12/2018 | Rabenold et al. | |
| 11,188,979 | B2 | 11/2021 | Asher et al. | |
| 11,645,671 | B2 * | 5/2023 | Raviv | G06Q 30/0282 705/14.45 |
| 2001/0032175 | A1 | 10/2001 | Holden et al. | |
| 2006/0173770 | A1 * | 8/2006 | McKay | G06Q 40/04 705/37 |
| 2006/0229972 | A1 * | 10/2006 | Melo | G06Q 40/04 705/37 |
| 2009/0106165 | A1 | 4/2009 | Solomon | |
| 2010/0332583 | A1 | 12/2010 | Szabo | |
| 2013/0084878 | A1 * | 4/2013 | Chen | H04W 72/56 455/452.1 |
| 2014/0032363 | A1 | 1/2014 | Zhao et al. | |

(Continued)

OTHER PUBLICATIONS

Nazia Majadi, Jarrod Trevathan, Neil Bergmann, Collusive shill bidding detection in online auctions using Markov Random Field, Electronic Commerce Research and Applications, vol. 34, 2019, 100831, ISSN 1567-4223, https://doi.org/10.1016/j.elerap.2019.100831. (Year: 2019).*

(Continued)

*Primary Examiner* — Michelle T Kringen
(74) *Attorney, Agent, or Firm* — Seyfarth Shaw LLP

(57) ABSTRACT

A method for dynamically adjusting one or more elements associated with an electronic transaction includes initiating a time period for receiving live offers, via an online interface, for an item associated with a listing on an online retail platform. The listing may be associated with the time period and an offer increment. The method also includes receiving, from a remote buyer, an offer on the item. The method further includes adjusting the time period and/or the offer increment based on receiving the offer and one or more adjustment factors. The method still further includes repeating the adjusting of the time period and/or the offer increment until the time period expires. The method also includes ending the listing based on an expiration of the time period.

20 Claims, 5 Drawing Sheets

(56) References Cited

U.S. PATENT DOCUMENTS

| | | | | |
|---|---|---|---|---|
| 2014/0279163 | A1* | 9/2014 | Gladis | G06Q 30/0202 705/26.3 |
| 2015/0111591 | A1* | 4/2015 | Hoffberg | G06Q 20/065 455/452.1 |
| 2015/0287132 | A1* | 10/2015 | Hudson | G06Q 30/08 705/26.3 |
| 2017/0024484 | A1* | 1/2017 | Qiu | H04W 4/02 |
| 2017/0103451 | A1* | 4/2017 | Alipov | G06Q 30/08 |
| 2018/0204277 | A1 | 7/2018 | Gard et al. | |
| 2019/0347713 | A1 | 11/2019 | Cohen | |

OTHER PUBLICATIONS

R. Mateless, H. Zlatokrilov, L. Orevi, M. Segal and R. Moskovitch, "IPvest: Clustering the IP Traffic of Network Entities Hidden Behind a Single IP Address Using Machine Learning," in IEEE Transactions on Network and Service Management, vol. 18, No. 3, pp. 3647-3661, Sep. 2021, doi: 10.1109/TNSM.2021 (Year: 2021).*

Leong, Jia Yi Jayme et al., Designing Auctions to Protect Competition and to Promote Efficiency and Revenue, Journal of Competition Law & Economics, vol. 12, Issue 2, Jun. 2016, pp. 313-340, https://doi.org/10.1093/joclec/nhw006.

Pavel Andreyanov et al., Secret Reserve Prices by Uninformed Sellers (Nov. 30, 2020). Abstract and pp. 1-59. Available at SSRN: https://ssrn.com/abstract=3761377 or http://dx.doi.org/10.2139/ssrn.3761377.

International Search Report and Written Opinion—PCT/US2024/15216—ISA/US—May 22, 2024.

* cited by examiner

DYNAMIC TIMING AND PRICING FOR ONLINE RETAIL PLATFORM

FIELD OF THE DISCLOSURE

The present disclosure relates generally to online retail platforms, and more specifically to dynamically adjusting one or more properties associated with selling an item via an online platform.

BACKGROUND

Retail platforms bring buyers and sellers together in transacting a sale of goods. In some conventional in-person retail platforms, potential buyers (e.g., bidders) physically gather in one location and a representative of the retail platform calls for offers on an item, one item at a time. The item may be sold to a buyer with the highest offer when a time period associated with the sale of the item expires. In an effort to improve the convenience of such retail platforms, some retail platforms allow potential buyers to submit offers remotely (e.g., over the telephone or the Internet). In some cases, a seller may use an online retail platform (e.g., an Internet-based retail platform) to post descriptions and pictures of items they intend to sell. In such cases, buyers browse through posted items and electronically submit offers. In most online retail platforms, buyers may submit offers as soon as a seller lists an item. A time period for receiving offers may be limited, and the item may be sold when the time period expires. Buyers may submit offers up to the designated end time, and the winning offer may be the highest offer at end time.

SUMMARY

In one aspect of the present disclosure, a method for dynamically adjusting one or more elements associated with an electronic transaction includes initiating a time period for receiving live offers, via an online interface, for an item associated with a listing on an online retail platform, the listing being associated with the time period and an offer increment. The method further includes receiving, from a remote buyer, an offer on the item. The method still further includes adjusting the time period and/or the offer increment based on receiving the offer and one or more adjustment factors. The method also includes repeating the adjusting of the time period and/or the offer increment until the time period expires. The method further includes ending the listing based on an expiration of the time period.

Another aspect of the present disclosure is directed to an apparatus including means for initiating a time period for receiving live offers, via an online interface, for an item associated with a listing on an online retail platform, the listing being associated with the time period and an offer increment. The apparatus further includes means for receiving, from a remote buyer, an offer on the item. The apparatus still further includes means for adjusting the time period and/or the offer increment based on receiving the offer and one or more adjustment factors. The apparatus also includes means for repeating the adjusting of the time period and/or the offer increment until the time period expires. The apparatus further includes means for ending the listing based on an expiration of the time period.

In another aspect of the present disclosure, a non-transitory computer-readable medium with non-transitory program code recorded thereon is disclosed. The program code is executed by a processor and includes program code to initiate a time period for receiving live offers, via an online interface, for an item associated with a listing on an online retail platform, the listing being associated with the time period and an offer increment. The program code further includes program code to receive, from a remote buyer, an offer on the item. The program code still further includes program code to adjust the time period and/or the offer increment based on receiving the offer and one or more adjustment factors. The program code also includes program code to repeat the adjusting of the time period and/or the offer increment until the time period expires. The program code further includes program code to end the listing based on an expiration of the time period.

Another aspect of the present disclosure is directed to an apparatus having a processor, and a memory coupled with the processor and storing instructions operable, when executed by the processor, to cause the apparatus to initiate a time period for receiving live offers, via an online interface, for an item associated with a listing on an online retail platform, the listing being associated with the time period and an offer increment. Execution of the instructions also cause the apparatus to receive, from a remote buyer, an offer on the item. Execution of the instructions further cause the apparatus to adjust the time period and/or the offer increment based on receiving the offer and one or more adjustment factors. Execution of the instructions still further cause the apparatus to repeat the adjusting of the time period and/or the offer increment until the time period expires. Execution of the instructions also cause the apparatus to end the listing based on an expiration of the time period.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
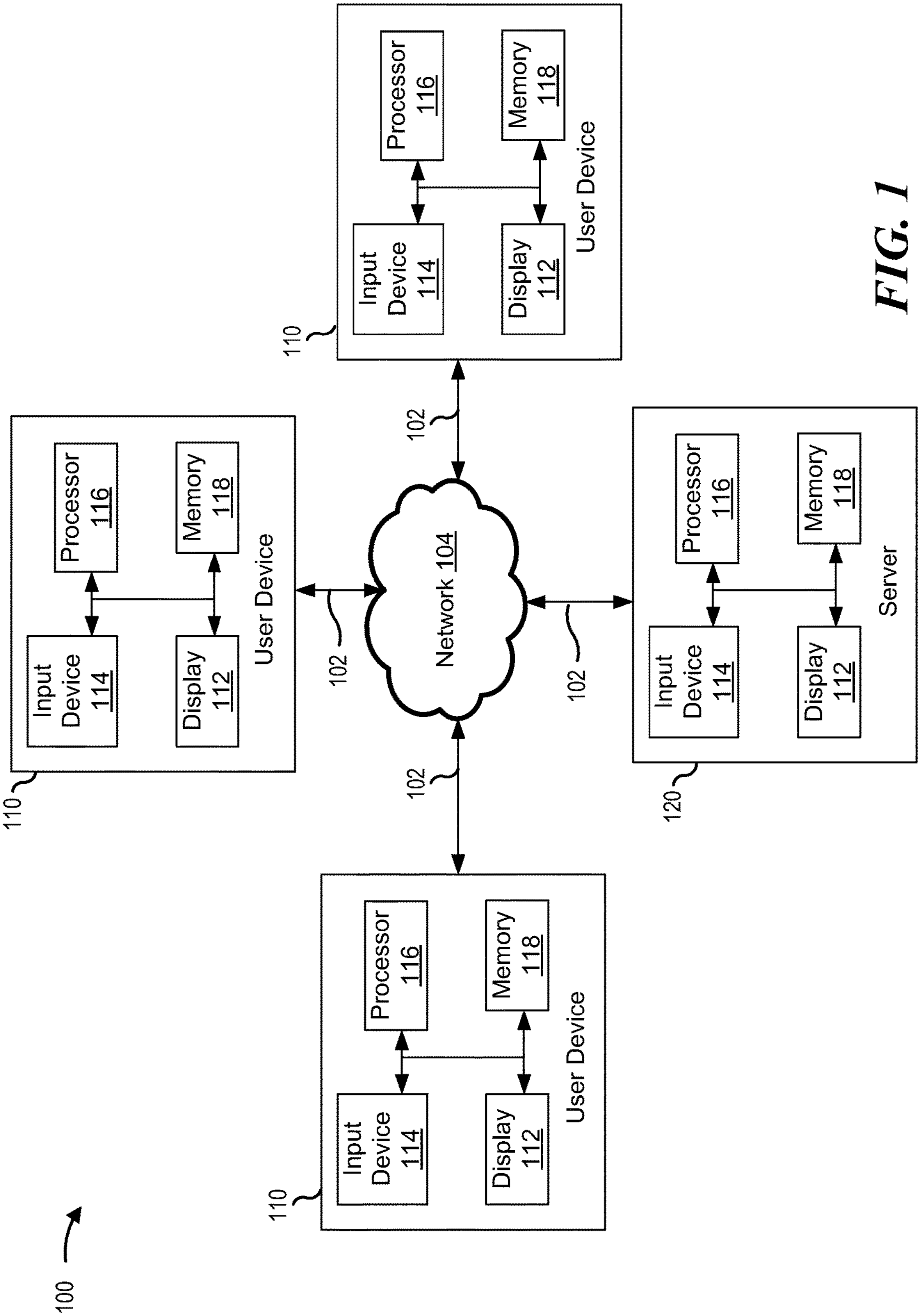
FIG. 1 is a block diagram illustrating an example of a system for system for an online retail platform, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of auction systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

As discussed, retail platforms, such as physical stores, bring buyers and sellers together in transacting a sale of goods. In some conventional in-person retail platforms, such as auctions, potential buyers (e.g., bidders) gather in one location and a representative (e.g., auctioneer) of the retail platform calls for offers (e.g., bids) on an item, one item at a time. The item may be sold to the buyer with the highest offer when there are no more bids and the representative decides to end the auction. For in-person retail platforms, an ending time may be random and up to the auctioneer. Conventional in-person retail platforms are time consuming and inefficient because a buyer cannot simultaneously make offers on multiple items. Rather, the representative of the retail platform sells one item at a time because it is impossible for a human to keep track of multiple offers being simultaneously made on different items. Furthermore, even if the retail platform used multiple representatives, where each representative sold a different item in a different physical location of the in-person retail platform (e.g., auction house), it would be physically impossible for an individual buyer to simultaneously make offers on multiple items because the buyer cannot be simultaneously present in different locations to provide the multiple in-person offers. Furthermore, attending an in-person retail platform may be time consuming and expensive because each buyer may have to pay transportation costs. As a result, fewer buyers may attend the in-person retail platforms. Therefore, a true market price of an item may not be achieved.

In some cases, a retail platform allows potential buyers to remotely submit offers (e.g., over the telephone or the Internet). In some cases, a seller may use an online retail platform (e.g., an Internet-based retail platform) to post descriptions and pictures of items. In such cases, buyers browse through posted items and electronically submit offers. In most online retail platforms, buyers may submit offers (e.g., place offers) on an item when the seller posts the item, and a time period for placing offers ends at a predetermined time. Buyers may place offers prior to the expiration of the time period, and the winning offer may be the highest offer at the end of the time period.

Online retail platforms may allow a buyer to make offers on a group of items. Additionally, online retail platforms allow sellers to sell groups of items. Each item of the group of items may have the same, or different, start time and end time as other items in the group of items. In such conventional online retail platforms, the time period for selling each item may be fixed. Additionally, although a buyer may place offers on multiple items, the buyer cannot simultaneously place offers on multiple items in the group of items. Rather, the buyer is limited to successively placing offers on each item of the group of items. That is, the buyer may place an offer on a first item, then navigate to an online page for a second item and make another offer, and so on.

Various aspects of the present disclosure are directed to a dynamic online retail platform in which a time period for selling each item may be dynamically adjusted based on one or more factors. In some examples, the time period may be dynamically increased when one or more factors are satisfied. For example, the time period may be increased when a number of persons watching the sale of the item is greater than a watcher threshold. The number of person watching the sale of the item may be determined based on a number of unique connections to a page (e.g., web-page) associated with the sale of the item. The unique connections may be determined based on IP addresses, device identifiers, and/or other identifiers. As another example, the time period may be increased when the time period between successive bids from the same or different buyers is less than an offer time period threshold. In such cases, dynamically increasing the time period may increase a selling price of the item by allowing buyers more time to make offers on the item. Such dynamic increases to the time period (e.g., live offer period) may not be possible in an in-person retail platform because conventional in-person retail platforms are not associated with a time period. That is, in conventional in-person retail platforms, the listing of the item ends when no other offers are received from the in-person or remote attendees. Furthermore, even if a conventional in-person retail platform was associated with a time period, it would not be feasible for a human to calculate such time adjustments while the time period for the auction is expiring. For example, given the number of factors used in determining the time adjustment, the auction may end by the time a human can calculate the time increase for a listing (e.g., an auction).

Additionally, or alternatively, in some examples, a price increment for each item may be dynamically adjusted based on one or more conditions. The price increment refers to a set value between successive offers. For example, a price increment may be set at $10, such that if a first offer on an item is $20, the next offer must be at least $30. In some examples, the price increment may be dynamically adjusted based on a time remaining for selling an item and/or a current price of an item. In such cases, dynamically increasing the price increment may increase a selling price of the item. In other such cases, decreasing the price increment may entice buyers to make more offers on an item, thereby increasing the selling price of the item.

Additionally, in some examples, a buyer may simultaneously make offers on multiple items. In such examples, the ability to simultaneously make offers on multiple items may improve an efficiency of online retail platforms by reducing an overall amount of network traffic. For example, network traffic may be reduced if a buyer places one offer, or a set of offers, via one data transmission, on multiple items in comparison to the buyer placing multiple consecutive offers, via consecutive data transmissions on multiple items. Additionally, the ability to simultaneously make offers on multiple items may also increase a selling price of items by allowing more buyers to make offers on each item.

FIG. 1 is a block diagram illustrating an example of a system for system 100 for an online retail platform. As shown in the example of FIG. 1, the system 100 may include one or more user devices 110 and one or more servers 120. For ease of explanation, only one server 120 is shown in the example of FIG. 1. Each user device 110 may be connected to a network 104 via one or more communication links 102. The communication links 102 may be wired and/or wireless communication links. The server 120 may also be connected to the network 104 via a communication link 102.

The network 104 may be an example of the Internet. Additionally, or alternatively, the network 104 may include any suitable computer network such as an intranet, a wide-area network (WAN), a local-area network (LAN), a wireless network, a digital subscriber line (DSL) network, a frame relay network, an asynchronous transfer mode (ATM) network, and/or a virtual private network (VPN). The communication links 102 may be any type of communication link that may be suitable for communicating data between user devices 110 and the server 120. For example, the communication links 102 may include one or more of network links, dial-up links, wireless links (e.g., Wi-Fi link, satellite link, or cellular communication link), or hard-wired links.

The server 120 may be a computing device, such as a server, processor, computer, cloud computing device, cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to host an auction site and communicate via a wireless or wired medium. In some examples, the server 120 may host an auction site. In some such examples, one or more server 120 may work in tandem to host the auction site. Specifically, the server 120 may be implement functions and/or computer code that runs the auction process via the auction site. The auction site refers to an online retail platform house that sells one or more items online via the network 104.

Each user device 110 may be an example of a personal computing device, a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. A user device 110 may be used by a seller to sell one or more items via the auction site. Additionally, or alternatively, a user device 110 may be used by a buyer to offer on one or more items via the auction site. In some examples, each user device 110 shown in FIG. 1 may be used by a different buyer, such that multiple buyers may be place offers on one or more items via the auction site hosted on the server 120. Each user device 110 and server 120 may be stationary or mobile.

In some examples, each user device 110 may be included inside a housing that houses components of the user device 110, such as one or more processors 116 and a memory 118. The housing may also include, or be connected to, a display 112 and an input device 114, which may be interconnected with other components of the user device 110. For ease of explanation, only one processor 116 is shown for each user device 110. In some examples, the one or more processors 116, the display 112, the input device 114, and the memory 118 may be interconnected via a bus architecture. The memory 118 may include one or more different types of memory, such as random access memory (RAM), static RAM (SRAM), dynamic RAM (DRAM), and/or another type of memory. Each user device 110 may also include a storage device (not shown in the example of FIG. 1), such as a hard disk (e.g., non-transitory computer readable medium). In some examples, the memory 118 and/or the storage device include program code (e.g., instructions) that may be executed by the processor 116 to control one or more functions of the user device 110. The input device 114 may be used by buyers to navigate to the auction site, browse through the auction site, submit offers on desired items, and/or perform other tasks. In some examples, the input device 114 may be used by sellers to navigate to the auction site, browse through the auction site, post items they intend to sell, and/or perform other tasks. Working in conjunction with one or more components of the user device 110, the processor 116 may receive product and sale information relating to the auctioned item, and control the display 112 to output auction information, such as, for example, a current highest offer, a minimum acceptable opening offer, an offer increment, an auction commencement time, and/or an amount of time left in an auction for one or more items. The display 112 may output (e.g., display) information received at the processor 116. In some examples, the processor 116 of the user device 110 is configured to perform operations and implement one or more elements associated with one or more processes, such as the processes 300, 400, and 500 described with respect to FIGS. 3-5, respectively.

In some examples, an auction host and/or an entity associated with the auction host may maintain the server 120. The server 120 may be included inside a housing that houses components of the server 120, such as one or more processors 116 and a memory 118. The housing may also include, or be connected to, a display 112 and an input device 114, which may be interconnected with other components of the user device 110. For ease of explanation, only one processor 116 is shown for the server 120. In some examples, the one or more processors 116, the display 112, the input device 114, and the memory 118 may be interconnected via a bus architecture. The memory 118 may include one or more different types of memory, such as RAM, SRAM, DRAM, and/or another type of memory. The server 120 may also include a storage device (not shown in the example of FIG. 1), such as a hard disk (e.g., non-transitory computer readable medium). In some examples, the memory 118 and/or the storage device include program code (e.g., instructions) that may be executed by the processor 116 to control one or more functions of the server 120. For example, the processor 120 may execute instructions for establishing auctions for specific items, allowing participants to partake in the auction, sort and accept offers on items, submit offers on behalf of potential buyers, and control other aspects of the online retail platforms. In some examples, the processor 116 of the server 120 is configured to perform operations and implement one or more elements associated with one or more processes, such as the process 300, 400, and 500 described with respect to FIGS. 3-5, respectively.

Figure 2:
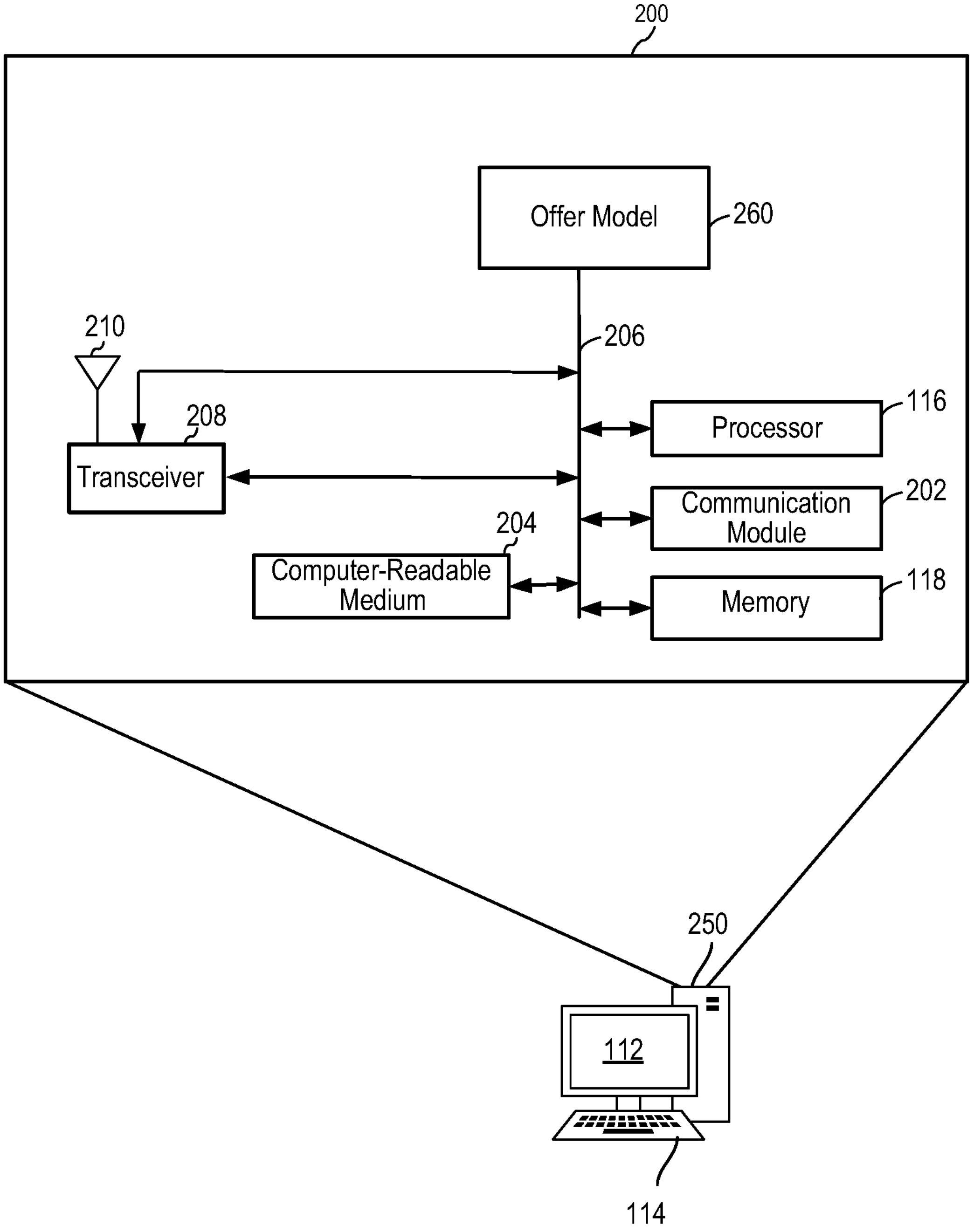
FIG. 2 is a diagram illustrating an example of a hardware implementation for a system, in accordance with various aspects of the present disclosure.

FIG. 2 is a diagram illustrating an example of a hardware implementation for a system 200, according to various aspects of the present disclosure. The system 200 may be a component of a device 250. The device 250 may be an example of a user device 110 or a server 120 described with reference to FIG. 1. As shown in the example of FIG. 2, the device 250 may include a display 112 and an input device 114 (e.g., a keyboard). In some examples, the system 200 is configured to perform operations and implement one or more elements associated with one or more processes, such as the processes 300, 400, and 500 described with respect to FIGS. 3-5, respectively.

The system 200 may be implemented with a bus architecture, represented generally by a bus 206. The bus 206 may include any number of interconnecting buses and bridges depending on the specific application of the system 200 and the overall design constraints. The bus 206 links together various circuits including one or more processors and/or hardware modules, represented by a processor 116, and a communication module 202. The bus 206 may also link various other circuits such as timing sources, peripherals, voltage regulators, and power management circuits, which are well known in the art, and therefore, will not be described any further.

The system 200 includes a transceiver 208 coupled to the processor 116, the communication module 202, and the computer-readable medium 204. The transceiver 208 is coupled to an antenna 210. The transceiver 208 communicates with various other devices over a transmission medium, such as a communication link 102 described with reference to FIG. 1. For example, the transceiver 208 may receive commands via transmissions from a user or a remote device.

As shown in the example of FIG. 2, the system 200 may include an offer model 260 that may be trained to perform one or more tasks associated with an online retail platform. For example, the offer model 260 may be trained to adjust the live offer period and/or adjust the offer increment to entice more buyers, increase a final offer value, and/or increase a probability of satisfying a reserve price. Additionally, or alternatively, the offer model 260 may be trained to autonomously place offers and/or incremental offers on items associated with a reserve price to entice more buyers, increase a final offer value, and/or increase a probability of satisfying a reserve price. The offer model 260 may include artificial or computational intelligence elements, such as, neural network, fuzzy logic, or other machine learning algorithms. In one or more arrangements, one or more of the other modules 116, 118, 202, 204, 208, can also include artificial or computational intelligence elements, such as, neural network, fuzzy logic, or other machine learning algorithms. Further, in one or more arrangements, one or more of the modules 116, 118, 202, 204, 208 can be distributed among multiple modules 116, 118, 202, 204, 208, 260 described herein. In one or more arrangements, two or more of the modules 116, 118, 202, 204, 208, 260 of the system 200 can be combined into a single module.

The system 200 includes the processor 116 coupled to the computer-readable medium 204. The processor 116 performs processing, including the execution of software stored on the computer-readable medium 204 providing functionality according to the disclosure. The software, when executed by the processor 116, causes the system 200 to perform the various functions described for a particular device, such as any of the modules 116, 118, 202, 204, 208, 260. For example, when executed by the processor 116, the software causes the system 200 and/or the offer model 260 to implement one or more elements associated with one or more processes, such as the processes 300, 400, and 500 described with respect to FIGS. 3-5, respectively. The computer-readable medium 204 may also be used for storing data that is manipulated by the processor 116 when executing the software. For example, working in conjunction with one or more of the other modules the modules 116, 118, 202, 204, and 208, the offer model 260 may initiate a time period for receiving live offers, via an online interface, for an item associated with a listing on an online retail platform. The listing may be associated with the time period and an offer increment. The offer model 260 may also receive, from a remote buyer, an offer on the item. The offer model 260 may further adjust the time period and/or the offer increment based on receiving the offer and one or more adjustment factors. The offer model 260 may also repeat the adjusting of the time period and/or the offer increment until the time period expires. The offer model 260 may end the listing based on an expiration of the time period.

As indicated above, FIGS. 1 and 2 are provided as examples. Other examples may differ from what is described with regard to FIGS. 1 and 2.

As discussed, various aspects of the present disclosure are directed to an online retail platform. In some examples, multiple items may be simultaneously placed for sale via the online retail platform (e.g., online auction). In some such examples, a group of items may be associated with a same category, and each item of the group of items may be simultaneously placed for sale. Furthermore, a buyer may simultaneously place an offer (e.g., bid) on two or more items of the group of items. In some examples, the respective time period for selling each listed item and respective price increments for each listed item may be dynamically adjusted based on one or more factors. Additionally, in some such examples, a seller can monitor activity, such as offers, on one or more items and interact within the live online retail platform environment. For example, the seller may manually adjust one or more parameters associated with selling an item, these parameters may include, for example, an end time, a reserve price, and/or a price increment.

As discussed, in some examples, a buyer may simultaneously place an offer on two or more items of a group of items using the online retail platform. In some such examples, each item may be placed on sale at the same time. Each item may be associated with a reserve price or may be based on an absolute price. In some examples, a buyer may place one or more pre-offers on an item, such that the online retail platform may place the pre-offer on the item as soon as the selling time period associated with the item is activated. In some examples, a buyer may use a token to extend a selling time period associated with an item. The token may be referred to as an auction extension token or an electronic token. The token may use proprietary technology associated with the retail platform or may be associated with an established technology, such as an electronic coin or a blockchain coin. The selling time period refers to an amount of time an item can receive offers. In some examples, a seller may accept an offer that is less than a set reserve price.

As discussed, in conventional retail platforms, such as online or in-person retail platforms, each item may be associated with a pre-determined selling time period. In such online retail platforms, the pre-determined selling time period may be fixed and cannot be dynamically adjusted. Additionally, in conventional online retail platforms, a buyer may successively place offers on multiple items. That is, the buyer places an offer on each item of a group of items, one after another. However, such offers may not be simultaneously placed on multiple items. Therefore, for in-person offers, the process for placing offers on multiple items is time consuming. Also, the buyer may miss out on one item while placing an offer on another item. As discussed, it may be physically impossible for a buyer to simultaneously place offers on two or more items of a group of offers in an in-person retail platform.

Figure 3:
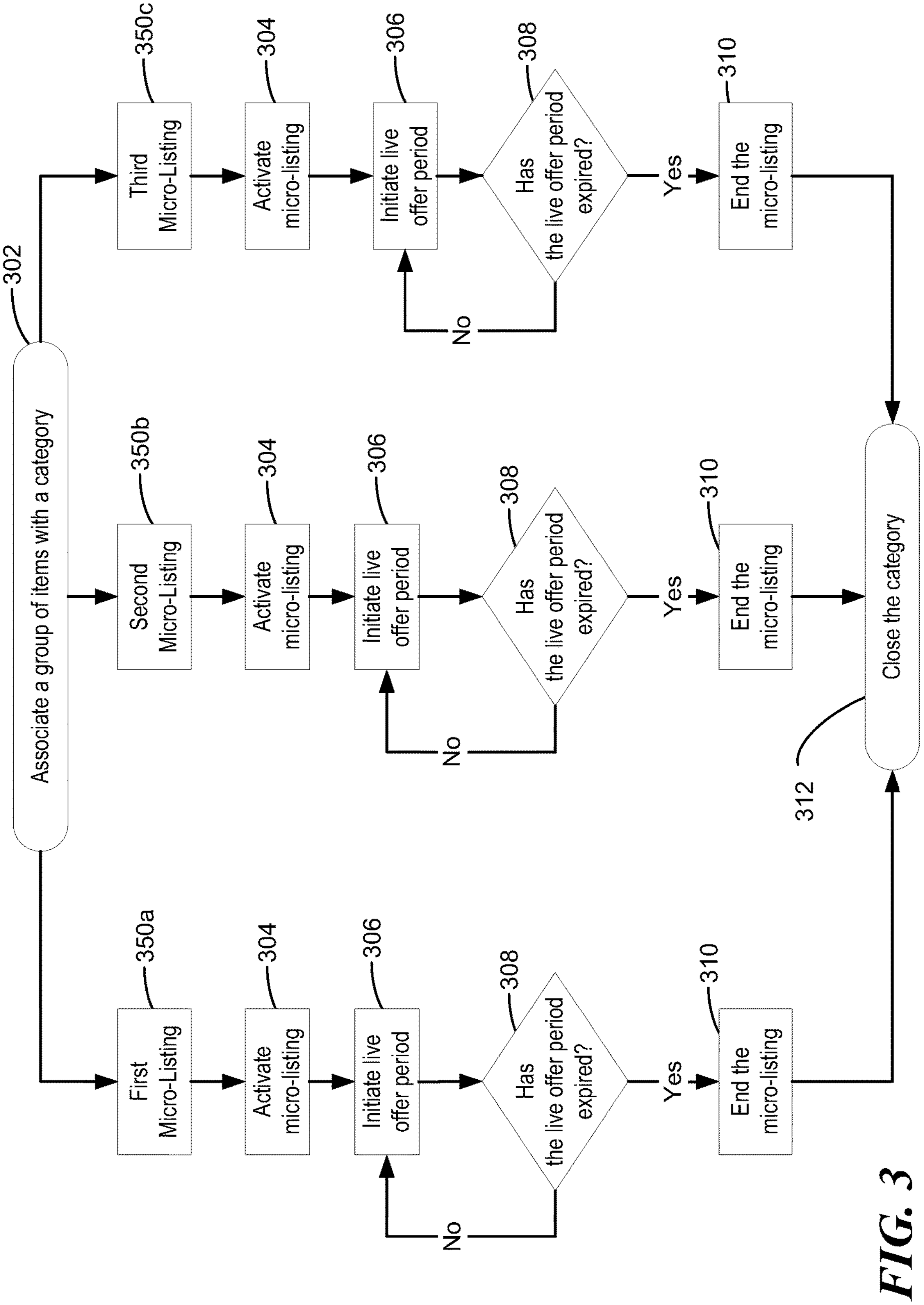
FIG. 3 is a flow diagram illustrating a process for selling multiple items in a retail platform, in accordance with various aspects of the present disclosure.

Various aspects of the present disclosure are directed to providing a buyer with an option to simultaneously place offers on multiple items. FIG. 3 is a flow diagram illustrating a process 300 for selling multiple items (multi-item) in a retail platform, in accordance with various aspects of the present disclosure. In the example of FIG. 3, at block 302, a seller, an online retail platform, or a representative associated with the online retail platform may associate a group of items with a category. For example, a group of jewelry items may be associated with a jewelry category. In some examples, the items may be manually associated with a category. In such examples, a number of pre-determined categories may be provided to a seller, and the seller may associate an item with one of the pre-determined categories.

In some other examples, the online retail platform may categorize items based on one or more of keywords associated with an item, item descriptions, item images, or other item attributes. The keywords and descriptions may be manually entered by a seller or an affiliate of the auction host. Additionally, or alternatively, the keywords and descriptions may be autonomously generated by the online retail platform based on a machine learning model or other computer-based functions. Additionally, or alternatively, a machine learning model may be used to associate items with categories based on the item images and/or other item attributes. The machine learning model may be referred to as an offer model, such as the offer model 260 described with reference to FIG. 2. The items associated with the same category may be listed by one or more different sellers. For example, one seller may list two items associated with a category, and another seller may list one item associated with the category. As another example, the same seller may list all items associated with the category.

Each item of the group of items associated with a category may be placed for sale via the online retail platform. The listing of each item may be referred to as a micro-listing 350*a*, 350*b*, 350*c*. In the current application, a listing may be an example of a micro-listing, such as one of the micro-listings 350*a*, 350*b*, 350*c*. The listing refers to a listing of the item for sale on the online retail platform. As shown in the example of FIG. 3, a first micro-listing 350*a* may be a listing for a ring, a second micro-listing 350*b* may be a listing for a necklace, and a third micro-listing 350*c* may be a listing for a bracelet. A number of micro-listings associated with a category is not limited to three micro-listings, as any number of micro-listings may be associated with the category. At block 304, each micro-listing 350*a*, 350*b*, 350*c* may be activated. In some examples, the micro-listing 350*a*, 350*b*, 350*c* may be activated at the same time. In some other examples, a start time for one or more micro-listing 350*a*, 350*b*, 350*c* may be different than the other micro-listings micro-listing 350*a*, 350*b*, 350*c*. Buyers may place offers on an item once a micro-listing is activated. In some examples, such offers may be pre-offers (e.g., pre-bids). A pre-offer is an example of an offer that is placed on an item prior to the start of a live offer period of a micro-listing. The pre-offer may be a maximum amount that a buyer is willing to pay for an item. Additionally, seller activity for a micro-listing may begin once the micro-lasting is activated at block 304. Seller activity may include, but is not limited to, adjusting a reserve price and/or monitoring offers via a seller dashboard.

At block 306, each micro-listing 350*a*, 350*b*, 350*c* may start a respective live offer period. The live offer period may also be referred to as a selling time period or an auction period. In some examples, the live offer period of block 306 may begin when the micro-listing is activated at block 304. In some other examples, a start time for the live offer period of a micro-listing 350*a*, 350*b*, 350*c* may be randomized based on one or more conditions, such as a number of pre-offers placed on an item. Each micro-listing 350*a*, 350*b*, 350*c* may be associated with a respective offer time period. The offer time period for each micro-listing 350*a*, 350*b*, 350*c* may be the same or different. An offer time period is a period of time for receiving offers on an item. The offer time period begins when the live offer period begins at block 306.

In some examples, when the live offer period of a micro-listing has started, an initial offer amount may be pre-set by a seller or an online retail platform. The initial offer amount may be a minimum offer amount that may be initially placed on an item. For example, if the initial offer amount is $10, the first offer on an item must be equal to or greater than $10. Buyers may place live offers on an item during the live offer period. Additionally, the online retail platform may place offers on the item based on each pre-bid associated with the respective micro-listing. Successive bids on each item may be subject to a price increment (also referred to as an offer increment or a bid increment). As discussed, the price increment is an increment between successive offers. For example, the price increment may be set at $10, such that if a first offer on an item is $20, the next offer must be at least $30. Both live offers from buyers and offers placed based on pre-offers are subject to the price increment. In some examples, during a live offer period, the price increment may be adjusted as a function of a current offer price. For example, the price increment may increase as the current offer price increases.

In some examples, while each micro-listing 350*a*, 350*b*, 350*c* is live (e.g., before a respective live offer period of each micro-listing 350*a*, 350*b*, 350*c* expires), one or more of the respective live offer period or the respective price increment of each micro-listing 350*a*, 350*b*, 350*c* may be adjusted based on one or more factors. In some examples, the live offer period of a micro-listing 350*a*, 350*b*, 350*c* may be adjusted based on one or more of a number of buyers actively watching an item, a number of pre-offers, a current offer price, an amount of time between offers from a same buyer, an amount of time between offers from different buyers, a number of offers, or other conditions. Additionally, the price increment may be adjusted based on one or more factors, such as an amount of time remaining in the respective micro-listing or a current price of the item.

At block 308, each micro-listing 350*a*, 350*b*, 350*c* determines if the respective live offer period has expired. If the live offer period has not expired, the live offer period at block 306 may continue, such that additional bids may be received. Additionally, or alternatively, the live offer period and the price increment may continue to be adjusted until the live offer period ends. As shown in the example of FIG. 3, if the respective live offer period for a micro-listing 350*a*, 350*b*, 350*c* has expired, at block 308, the online retail platform ends the respective micro-listing 350*a*, 350*b*, 350*c* at block 310. No more offers may be accepted once a micro-listing 350*a*, 350*b*, 350*c* has ended. Additionally, the item associated with the deactivated micro-listing 350*a*, 350*b*, 350*c* may be sold to the buyer associated with the highest offer. At block 312, a category associated with each of the micro-listings 350*a*, 350*b*, 350*c* may be closed once each micro-listing 350*a*, 350*b*, 350*c* ends.

In some examples, a buyer may use a digital token to extend a live offer period associated with a micro-listing. By using the digital token to extend the live offer period, the buyer may increase their chance to place offers on multiple items and also extends the available time to place winning offers. In some examples, a buyer may earn a digital token based on a previous offer and/or purchase activity. Additionally, or alternatively, the buyer may purchase one or more digital tokens. In some examples, each digital token may be associated with an expiration date.

Each digital token may be associated with a specific amount of time for extending the live offer period. In some examples, a time period for applying a digital token may be limited to when an amount of time remaining in the live offer period is less than a threshold. As an example, the digital token may only be applied if the remaining amount of time is less than or equal to two minutes. In some examples, if two or more buyers apply a digital token to extend the live offer period, a time for the live offer period will be extended based on the digital token with the highest extension period. For example, one digital token may extend the live offer period for one minute, and another digital token may extend the live offer period for two minutes. In such an example, if both digital tokens are applied during the live offer period, the live offer period may be extended for two minutes.

As discussed, a buyer may earn digital tokens based on offer and/or purchase activity. In one example, the buyer may earn a digital token for placing an offer on a specific number of items. In one such example, the buyer may earn the digital token for placing an offer on five items. As another example, the buyer may earn a digital token for placing a number of offers on a specific item. In one such example, the buyer may earn the digital token after placing ten offers on a single item. In another example, the buyer may earn a digital token after purchasing a certain number of items.

In some examples, the online retail platform may provide a dashboard for a seller to monitor item activity during a live offer period associated with a listing, such as a micro-listing. The dashboard may be referred to as a seller dashboard. The item activity may include a current highest offer, offer history, and offer prices. Additionally, if the item is associated with a reserve price, the seller may modify the reserve price from the seller dashboard. As an example, the seller may lower the reserve price at any point via the seller dashboard. The reserve price may not be modified to be less than the current price (e.g., current highest offer) of the item. In some examples, if the item is associated with a reserve price, during the live offer period, the seller may accept, via the seller dashboard, an offer that is less than the reserve price. Accepting the offer does not end the live offer period, rather, accepting the offer that is less than the reserve price may also reduce the reserve price. Additionally, buyers may continue to place offers during the live offer period if the seller lowers the reserve price and/or accepts an offer that is less than the reserve price. Furthermore, a status of the item may be changed to "reserve price met" if the seller accepts an offer that is less than the reserve price. Alternatively, the reserve price may be satisfied if a buyer places an offer that is equal to or greater than the reserve price. In a conventional in-person retail platform, such as an auction, a seller must be physically present at the in-person sale to reduce the reserve price or accept an offer that is less than the reserve price. For example, an auction manager may stand with the seller to make sure the seller knows the current bid. The auction manager may try to get the seller to lower his reserve and take the current bid. If the seller agrees to take a lower bid a signal is sent to the live auctioneer to accept the current bid and or a further bid. That is, the reserve is lifted and the item will sell, but the auctioneer keeps looking for more bids. Still, in the in-person retail platform, the seller cannot simultaneously lower the reserve on multiple items. In contrast, aspects of the present disclosure allow a seller to simultaneously adjust the reserve price on multiple items, thereby improving efficiency for the seller. As discussed, in some configurations, the reserve price for multiple items may be adjusted via a seller dashboard, which may be accessed via an online interface, such as a website. By allowing the seller to simultaneously adjust the reserve price on multiple items via a single interface, rather than adjusting one item at a time, aspects of the present reduce overall network bandwidth because the seller is not forced to visit each individual auction website to adjust the reserve price.

Figure 4:
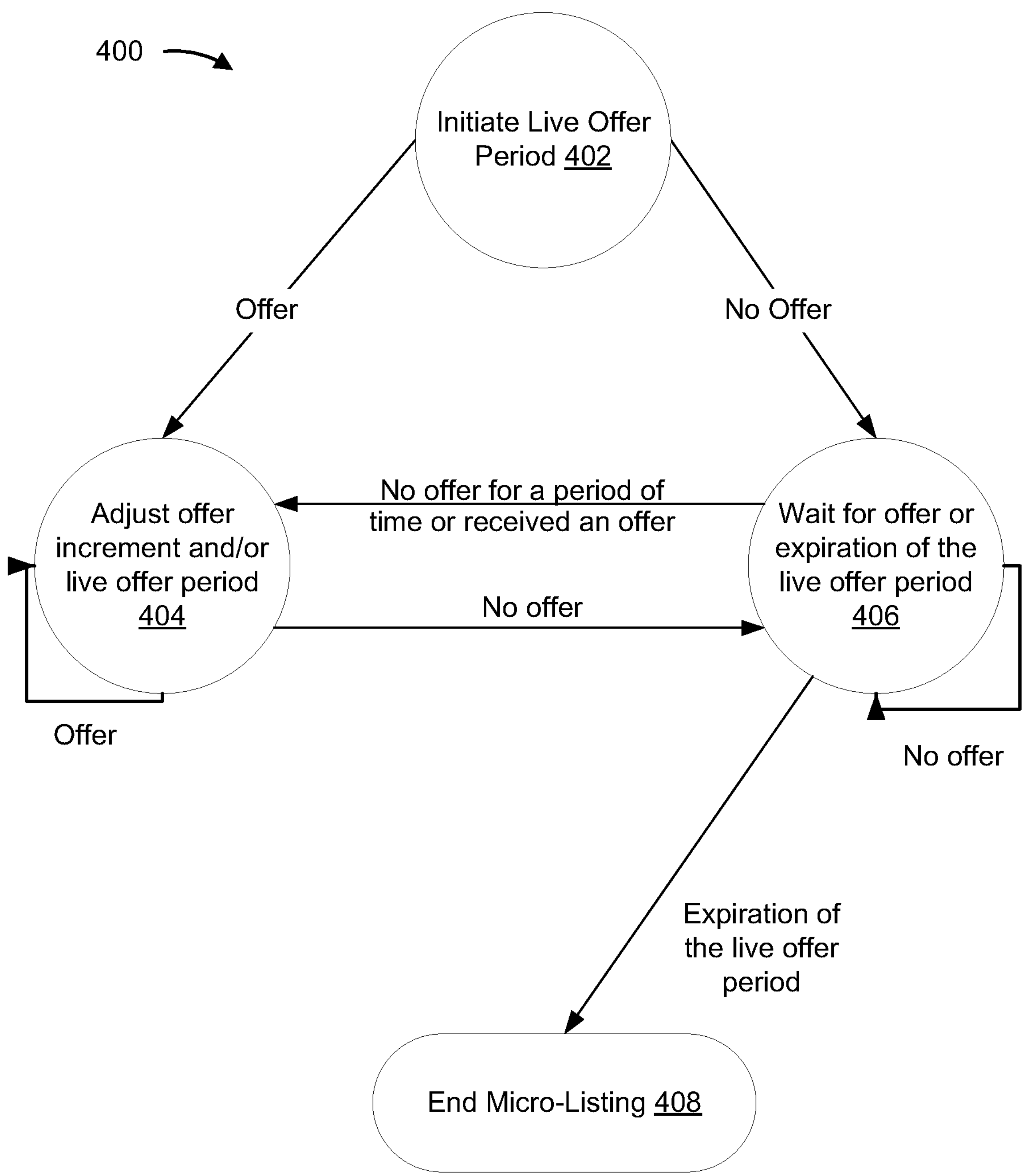
FIG. 4 is a flow diagram illustrating a process for incrementing a price of an item, in accordance with various aspects of the present disclosure.

As discussed, a live offer period may begin for an item after the item is activated to receive offers. In some examples, one or more buyers may place pre-offers on an item. In some other examples, no pre-offers are placed on an item. Additionally, price increments may be specified during the live offer period as a function of a highest current offer (e.g., current item price). FIG. 4 is a flow diagram illustrating a process 400 for incrementing a price of an item, in accordance with various aspects of the present disclosure. The process 400 may be implemented via a system, such as the system 200 described with regard to FIG. 2. For ease of explanation, the process 400 is directed to one micro-listing. Still, aspects of the present disclosure are not limited to one micro-listing, as discussed, multiple micro-listings may be concurrently active via the online retail platform. Furthermore, the process 400 may be applied to one or more micro-listings that are concurrently active.

As shown in the example of FIG. 4, the process 400 begins at block 402 by initiating a live offer period, such as the live offer period initiated at block 306 of FIG. 3. In some examples, no pre-offers may be placed on an item in a micro-listing. In such examples, if no live offers are received for the item, the process 400 proceeds to wait until an offer or expiration of the live offer period. If an offer is received while waiting at block 406, the process 400 proceeds to adjust an offer increment and/or adjust the live offer period, at block 404. In some examples, the offer increment and/or the live offer period may be adjusted by an offer model (e.g., a machine learning model) that is trained to entice bidding. The offer model may be an example of the offer model 260 described with reference to FIG. 2. For example, the offer model may increase the live offer period to allow more time for offers from buyers with a history of purchasing items. Additionally, or alternatively, the offer model may decrease the offer increment to entice additional bids from buyers that are watching the micro-listing.

At block 404, if another bid is subsequently received within a period of time from the previous bid, the process continues to adjust the offer increment and/or the live offer period at block 404. Alternatively, at block 404, if a subsequent bid is not received within the period of time of the previous bid, the process 400 returns to block 406 to wait for an offer or expiration of the live offer period. At block 406, the process continues to wait for the offer or expiration of the live offer period if no bids are received. In some examples, at block 406, if no bids are received, the process 400 may adjust the offer increment to entice additional bids (not shown in FIG. 4). Additionally, at block 406, if the live offer period expires, the process 400 ends the auction at block 408.

In some examples, an item in a micro-listing may be associated with a reserve price. A reserve price listing is a type of listing where a seller sets a minimum price (e.g., the reserve price) that they are willing to accept for the item being sold. As such, if no offers reach the reserve price, the item will not be sold. Buyers are typically not made aware of the reserve price, and the listing proceeds in the same way as a traditional listing, with buyers placing offers in specified increments until a live offer period ends. In some examples, buyers may be notified if the reserve is satisfied. If the final offer meets or exceeds the reserve price, the item is sold to the buyer associated with the highest. If the final offer is below the reserve price, the item remains unsold. The reserve price listing is a useful tool for the seller, as it ensures they receive a minimum price for the item, while allowing for the possibility of a higher price through competitive offers. In the example of FIG. 4, when the live period offer ends at block 408, the item may not be sold to a highest if the highest offer is not equal to or greater than the reserve price. Additionally, as discussed, in some examples, a seller may reduce the reserve price during the live offer period.

In the example of FIG. 4, if an item is associated with a reserve price, the offer model may autonomously place bids to entice action from other buyers. In some examples, the offers placed by the offer model may be placed until an item price is within a range of the reserve price. For example, the offer model may place offers until the highest offer is within a certain percentage of the reserve price. The offer model may be trained to place the offers when one or more conditions are satisfied. The offers may be placed by the offer model when the process is waiting at block 406, within a time period of another offer at block 404, or upon initiating the live offer period at block 402. The one or more conditions may include a waiting time at block 406 being greater than or equal to a waiting time threshold, an amount of offers being less than an offer threshold, an amount of watchers being greater than a watcher threshold, an amount of consecutive offers being greater than or less than a consecutive offer threshold, and/or other conditions. In some examples, the offer model may be trained to place autonomous offers to give an impression that an item is popular (e.g., increase the offer activity on an item). In such examples, human buyers that are interacting with the online retail platform may be unaware that the offer model is placing autonomous offers. Therefore, the human buyers may believe that the item is popular, thus, the human buyers may be enticed to place an offer on the item due to its popularity. Put another way, the human buyers may have a fear of missing out when they notice the increase in the offer activity on the item.

As discussed, in some examples, one or more pre-offers may be placed on an item prior to initiating the live offer period. Each pre-offer may be for a different offer amount. If a buyer attempts to place a pre-offer for a same amount as another pre-offer, the online retail platform may inform the buyer that their pre-offer is not valid and request that the buyer place a higher pre-offer amount. In such examples, when one or more pre-offers are placed on an item, the process 400 may autonomously place an offer on the item, in which the offer is an increment of a respective pre-offer. In some such examples, the process 400 may autonomously place a respective offer from each of the one or more pre-offers to give the illusion of activity from live buyers.

As an example, at block 402, the live offer period may begin with a two minute period. The two minute period may be associated with a countdown timer. In response to activating the live offer period, the process 400 may place an initial offer corresponding to one of the one or more pre-offers previously placed on the item. The offer that corresponds to the pre-offer may be an increment of the pre-offer. As discussed, the increment may be a percentage of the reserve or an estimated price increment. The offer that corresponds to the pre-offer may be referred to as an incremental offer. The incremental offer may be placed once the live offer period is activated or at a randomized time after the live offer period is active. Once an incremental offer has been placed during the live period, the process may adjust the offer increment and/or the live offer period at block 404. Additionally, in some examples, after placing the incremental offer, the process 400 may pause for a pre-determined time period and wait for live bids (e.g., bids from real buyers). In such examples, if there are no live bids, the process 400 may place another incremental offer, having a greater value than a previous incremental offer, corresponding to the same pre-offer or another pre-offer. The process 400 may repeatedly place incremental offers until there are no more live bids or a highest pre-offer amount of the one or more pre-offers is reached. After this point, the live offer period may expire and the auction will end.

In another example, an item in a micro-listing may have a $20 reserve price. The reserve price may be known to the device implementing the process 400. In this example, a highest pre-offer may be $15. At block 402, the live offer period begins with a two minute live offer period, the item (or each item associated with a category) may start at $1, and the offer increment may be $5. The process 400 may place an incremental offer of $5 (e.g., 25% of the reserve price) once the live offer period beings. Additionally, at block 404, based on the incremental offer, the process 400 may add ten seconds to the live offer period. The process 400 may then repeat the placing of an incremental offer and may place a subsequent incremental offer of $10 (e.g., $5 greater than the previous incremental offer to satisfy the offer increment value), thereby bringing the current offer to $10. Additionally, at block 404, based on the incremental offer, the process 400 may add another ten seconds to the live offer period.

After placing the subsequent incremental offer, the process 400 may wait at block 406 for a live offer before placing another incremental offer based on the pre-offer. In this example, a live offer may be placed when the process 400 is waiting at block 406. Because the offer increment is $5, the live offer should be equal to or greater than $15 because the current highest offer is $10. In this example, the live offer may be for $20, thus placing the current highest offer at $20. Because the current highest offer of $20 is equal to the highest pre-offer amount, the process 400 does not place any more incremental offers. Furthermore, at block 404, the process 400 may adjust to offer increment to 25% of the current highest bid (e.g., $6.25) for live offers. The process 400 may then wait, at block 406, for more live offers or for the live offer period to expire. After a pre-determined amount of time with no activity, the process 400 adjusts the offer increment to 10% of the current highest offer (e.g., $2.50) to entice new live offers. The live offer period may expire if no new live offers are received, such that the listing ends at block 408.

As discussed in the example of FIG. 4, at block 404, the process 400 may adjust an offer increment and/or adjust a live offer period (e.g., extend the live offer period) based on one or more factors. In some examples, an offer model (e.g., machine learning model) may be trained to adjust the live offer period, adjust the offer increment to entice more buyers, increase a final offer value, and/or increase a probability of satisfying a reserve price. Such adjustments are not possible for a human to calculate in real-time for one or more listings. For example, by the time a human calculates one or more adjustments (e.g., adjusting the live offer period, adjusting just the offer increment to entice more buyers, increasing a final offer value, and/or increasing a probability of satisfying a reserve price) a large amount of time may have passed in each auction, thereby making the calculations moot because the calculations should be conducted in real-time to satisfy the dynamic nature of the auction. In some examples, the offer model may be trained on a set offer increment chart to dictate offer increments based on a current highest offer. Additionally, or alternatively, the offer increment may be adjusted based on an amount of time remaining in a live offer period, a number of offers received, a reserve price, historical offer patterns for similar items, and/or other factors. Additionally, the offer model may be trained to adjust the live offer period. In some examples, the offer model may increase the live offer period after an offer (e.g., a live offer or an incremental offer corresponding to a pre-offer). In some other examples, the offer model may increase the live offer period after waiting for a period of time for an offer. The live offer period may be adjusted based on one or more factors, such as a number of buyers watching a current micro-listing, a number of pre-offers placed on an item, a current offer price, a time between successive offers, a number of offers placed on an item, a rating of a buyer, a rating of a seller, and/or other factors. As an example, the offer model may determine the number of buyers watching the current micro-listing by determining the number of devices connected to the online retail platform. These devices may be filtered by device ID, IP address, or another type of identifier.

In some examples, the online auction platform allows buyers to create a personalized view of one or more upcoming listings (e.g., micro-listings). For example, a buyer may view all items available for sale in one or more categories, pre-bid one on or more items, select (e.g., watch or favorite) certain items. These selected items are then saved in the buyer's dashboard, where the buyer can be further edited and arranged in preparation for the live listing. The buyer can customize the size of the item boxes displayed, filter items, and preview their personalized view prior to the live listing. This allows buyers to optimize their experience and make more informed decisions during the live listing.

Figure 5:
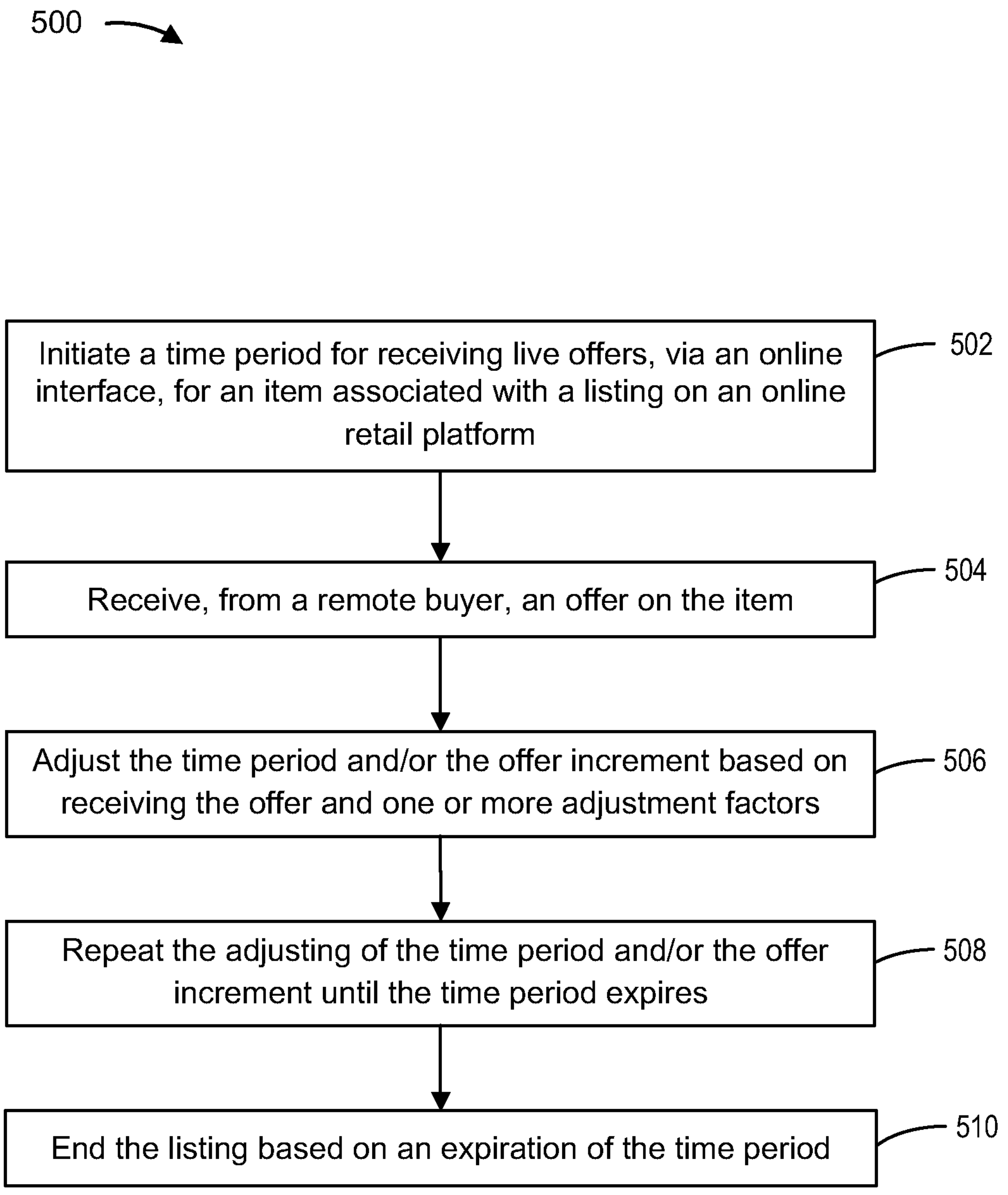
FIG. 5 is a flow diagram illustrating an example process performed, for example, by a device, in accordance with various aspects of the present disclosure.

FIG. 5 is a flow diagram illustrating an example process 500 performed, for example, by a device, in accordance with various aspects of the present disclosure. The device may be an example of a device 250 described with reference to FIG. 2. The example process 500 is an example of dynamically adjusting one or more elements of an electronic transaction, in accordance with various aspects of the present disclosure. As shown in the example of FIG. 5, at block 502 the process beings by initiating a time period for receiving live offers, via an online interface, for an item associated with a listing on an online retail platform. The listing may be associated with the time period and an offer increment. The online retail platform may be an example of an online auction site. Additionally, the electronic transaction takes place via the online retail platform. In some examples, the listing of the item is one listing of a group of listings. For example, the listing may be for a jewelry item and each item in the group of listings may be a jewelry item, or an item associated with jewelry. Additionally, the group of listings and/or each item in the group of listings may be associated with one or more listing categories. For example, the group of listings may be associated with a jewelry category and another category, such as home goods or fashion items. In some examples, the listing may be associated with a reserve price. In some such examples, the process 500 may place (e.g., enter) via a machine learning model (e.g., offer model), one or more autonomous offers on the item. Each of the one or more autonomous offers may be less than the reserve price. Furthermore, the one or more autonomous offers may simulate live offers from one or more remote buyers. In some examples, when the item is associated with a reserve price, the process 500 may receive, from a seller associated with the item, a message requesting a decrease in the reserve price. In such examples, the process 500 may decrease the reserve price based on receiving the message, wherein the seller is located remotely.

At block 504, the process 500 receives, from a remote buyer, an offer on the item. In some examples, the offer is one offer of a group of offers received from the remote buyer. Each offer of the group of offers may be associated with a respective listing of the group of listings and/or one or more other groups of listings. The group of offers may be simultaneously placed on the respective listings.

At block 506, the process 500 adjusts the time period and/or the offer increment based on receiving the offer and one or more adjustment factors. The one or more adjustment factors include one or more of a number of active connections from remote users to the online listing, a number of offers on the item associated with the online listing, a time between successive offers, an amount of time remaining in the time period, a current highest offer, a rating of the remote buyer, a reserve price, or a number of pre-offers. The number of active connections may be determined by monitoring network traffic, including wired and wireless connections to a server associated with the online listings. In some examples, the connections may be filtered by device ID (e.g., IP address, user ID, and/or one or more other types of filtering parameters to determine a number of unique active connections. In some examples, the process 500 receives, from the remote buyer, a pre-offer on the item prior to initiating the time period. In such examples, the process 500 may place (e.g., enter), via a machine learning model (e.g., offer model), one or more incremental offers on the item based on a total value of the pre-offer. The one or more incremental offers may simulate live offers from one or more remote buyers. Furthermore, the one or more incremental offers are placed until a highest offer on the item is equal to or greater than the total value of the pre-offer.

As shown in the example of FIG. 5, at block 508, the process 500 repeats the adjusting of the time period and/or the offer increment until the time period expires. Finally, at block 510, the process 500 ends the listing based on an expiration of the time period. The item may be sold to the buyer with the highest offer after the listing has expired, thereby completing the electronic transaction.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for dynamically adjusting one or more elements associated with an electronic transaction at a server hosting an online retail platform, comprising:

initiating a time period for receiving live offers, via an online interface, for an item associated with a listing on the online retail platform, the listing being associated with the time period and an offer increment;

receiving, from a remote buyer, an offer on the item;

filtering a respective internet protocol (IP) address of each remote device connected to the server to determine a quantity of unique connections to the server, each IP address being filtered by monitoring network traffic received via one or more wired or wireless connections to the server, each remote device having a distinct IP address that is different from a user name of a remote user associated with the remote device;

adjusting, via a machine learning model trained to entice bidding on the item, the time period and the offer increment based on receiving the offer and the quantity of unique connections, as well as one or more of a time between successive offers, or a rating of the remote buyer;

generating, via the machine learning model, one or more simulated offers on the item, each simulated offer of the one or more simulated offers being autonomously placed by the machine learning model to increase a current offer on the item, and each simulated offer simulating a real offer from a human buyer;

repeating the adjusting of the time period and the offer increment in accordance with the quantity of unique connections until the time period expires; and ending the listing based on an expiration of the time period.

2. The method of claim 1, wherein:

the listing of the item is one listing of a group of listings; and the group of listings is associated with one or more listing categories.

3. The method of claim 2, further comprising receiving, from the remote buyer, a group of offers, each offer of the group of offers associated with a respective listing of the group of listings, wherein the group of offers are simultaneously placed on the respective listings of the group of listings.

4. The method of claim 1, wherein the time period and the offer increment are further adjusted based on one or more of a number of offers on the item associated with the online listing, an amount of time remaining in the time period, a current highest offer, a rating of the remote buyer, a reserve price, or a number of pre-offers.

5. The method of claim 1, wherein:

each of the one or more simulated offers is an incremental offer based on a total value of the offer received from the remote buyer; and the one or more simulated offers are placed until a highest offer on the item is equal to or greater than a threshold value.

6. The method of claim 1, wherein the online listing is associated with a reserve price.

7. The method of claim 6, wherein each of the one or more simulated offers is less than the reserve price.

8. The method of claim 6, further comprising:

receiving, from a seller associated with the item, a message requesting a decrease in the reserve price; and decreasing the reserve price based on receiving the message, wherein the seller is located remotely.

9. A server hosting an online retail platform, comprising:

at least one processor; and at least one memory coupled with the at least one processor and storing instructions operable, when executed by the at least one processor, to cause the server to:

initiate a time period for receiving live offers, via an online interface, for an item associated with a listing on the online retail platform, the listing being associated with the time period and an offer increment;

receive, from a remote buyer, an offer on the item;

filter a respective internet protocol (IP) address of each remote device connected to the server to determine a quantity of unique connections to the server, each IP address being filtered by monitoring network traffic received via one or more wired or wireless connections to the server, each remote device having a distinct IP address that is different from a user name of a remote user associated with the remote device;

adjust, via a machine learning model trained to entice bidding on the item, the time period and the offer increment based on receiving the offer and the quantity of unique connections, as well as one or more of a time between successive offers, or a rating of the remote buyer;

generate, via the machine learning model, one or more simulated offers on the item, each simulated offer of the one or more simulated offers being autonomously placed by the machine learning model to increase a current offer on the item, and each simulated offer simulating a real offer from a human buyer;

repeat the adjusting of the time period and the offer increment in accordance with the quantity of unique connections until the time period expires; and end the listing based on an expiration of the time period.

10. The server of claim 9, wherein:

the listing of the item is one listing of a group of listings; and the group of listings is associated with one or more listing categories.

11. The server of claim 10, wherein execution of the instructions further cause the apparatus to receive, from the remote buyer, a group of offers, each offer of the group of offers associated with a respective listing of the group of listings, wherein the group of offers are simultaneously placed on the respective listings of the group of listings.

12. The server of claim 9, wherein the time period and the offer increment are further adjusted based on one or more of a number of offers on the item associated with the online listing, an amount of time remaining in the time period, a current highest offer, a rating of the remote buyer, a reserve price, or a number of pre-offers.

13. The server of claim 9, wherein: each of the one or more simulated offers is an incremental offer based on a total value of the offer received from the remote buyer; and the one or more simulated offers are placed until a highest offer on the item is equal to or greater than a threshold value.

14. The server of claim 9, wherein each of the one or more simulated offers is less than the reserve price.

15. The server of claim 14, wherein execution of the instructions further cause the apparatus to:

receive, from a seller associated with the item, a message requesting a decrease in the reserve price; and decrease the reserve price based on receiving the message, wherein the seller is located remotely.

16. A non-transitory computer-readable medium having program code recorded thereon for dynamically adjusting one or more elements associated with an electronic transaction, the program code executed by a processor and comprising:

program code to initiate a time period for receiving live offers, via an online interface, for an item associated with a listing on the online retail platform, the listing being associated with the time period and an offer increment;

program code to receive, from a remote buyer, an offer on the item;

program code to filter a respective internet protocol (IP) address of each remote device connected to the server to determine a quantity of unique connections to the server, each IP address being filtered by monitoring network traffic received via one or more wired or wireless connections to the server, each remote device having a distinct IP address that is different from a user name of a remote user associated with the remote device;

program code to adjust, via a machine learning model trained to entice bidding on the item, the time period and the offer increment based on receiving the offer and the quantity of unique connections, as well as one or more of a time between successive offers, or a rating of the remote buyer;

program code to generate, via the machine learning model, one or more simulated offers on the item, each simulated offer of the one or more simulated offers being autonomously placed by the machine learning model to increase a current offer on the item, and each simulated offer simulating a real offer from a human buyer;

program code to repeat the adjusting of the time period and the offer increment accordance with the quantity of unique connections until the time period expires; and program code to end the listing based on an expiration of the time period.

17. The non-transitory computer-readable medium of claim 16, wherein the program code further comprises program code to receive, from the remote buyer, a group of offers, each offer of the group of offers associated with a respective listing of the group of listings, wherein the group of offers are simultaneously placed on the respective listings of the group of listings.

18. The non-transitory computer-readable medium of claim 16, wherein the time period and the offer increment are further adjusted based on one or more of a number of offers on the item associated with the online listing, an amount of time remaining in the time period, a current highest offer, a rating of the remote buyer, a reserve price, or a number of pre-offers.

19. The non-transitory computer-readable medium of claim 16, wherein each of the one or more simulated offers is an incremental offer based on a total value of the offer received from the remote buyer; and the one or more simulated offers are placed until a highest offer on the item is equal to or greater than a threshold value.

20. The non-transitory computer-readable medium of claim 16, wherein each of the one or more simulated offers is less than the reserve price.

* * * * *